United States Patent [19]

Archer

[11] 4,296,361
[45] Oct. 20, 1981

[54] CONTROL SYSTEMS

[75] Inventor: Michael A. Archer, Hamburg, Fed. Rep. of Germany

[73] Assignee: Lucas Industries Limited, Birmingham, England

[21] Appl. No.: 60,001

[22] Filed: Jul. 24, 1979

[30] Foreign Application Priority Data

Aug. 15, 1978 [GB] United Kingdom ............... 33341/78

[51] Int. Cl.³ .............................................. H02P 1/54
[52] U.S. Cl. ........................................ 318/54; 318/57; 318/56; 318/60; 318/67
[58] Field of Search ............... 318/34, 113, 105, 49, 318/53–57, 60, 63, 67, 87, 86, 88, 89; 180/6.5, 141, 142, 77 H

[56] References Cited

U.S. PATENT DOCUMENTS

| 2,515,982 | 7/1950 | Brane | 318/63 X |
| 3,720,863 | 3/1973 | Ringland et al. | 318/67 X |
| 3,814,199 | 6/1974 | Jones | 180/77 H X |
| 4,078,627 | 3/1978 | Brown et al. | 180/6.5 |

Primary Examiner—Ulysses Weldon

[57] ABSTRACT

A motor control system for a pair of motors which drive respective wheels of a vehicle which is steered by controlling the relative speed of the motors includes switch means, and a pair of resistors which are connected in a series circuit including the motors, when no current is being supplied to the motors in order to provide electrical braking of the motors.

5 Claims, 3 Drawing Figures

CONTROL SYSTEMS

This invention relates to a control system for a pair of driving motors of a vehicle, the vehicle being of the kind in which road wheels on opposite sides of the vehicle are driven by the motors respectively, the steering of the vehicle being achieved by varying the electric current flow to the two motors whereby in use, one motor can drive its associated road wheel more quickly than the other to achieve a steering action.

Control systems for use with the drive motors are known and in which two motor control circuits are provided, the operation of the circuits being under the control of a single manually operable lever which is movable to vary the relative current flow to the motors and also the direction of current flow. The lever is biased to a central inoperative position in which current flow to the motors is cut off and the motors electrically braked. Moreover, the same system provides for electrical braking of one of the motors if the lever is moved to a position in which the other motor is supplied with electric current and no current is supplied to the one motor. This control system condition would apply when the vehicle is steered down a gradient. Unfortunately there is a tendency for the vehicle to "slew" and it is now accepted that substantial electric braking of a motor as distinct to allowing the motor to rotate without current being supplied to it should only take place when both motors are braked.

The object of the invention is to provide a control system for the pair of motors of the vehicle of the kind specified in a simple and convenient form.

According to the invention a control system for a pair of driving motors of a vehicle of the kind specified comprises switch means operable to connect the two motors in a series circuit including resistor means, only when the flow of current to both motors is cut off.

An example of a control system in accordance with the invention will now be described with reference to the accompanying drawings in which.

Figure 1:
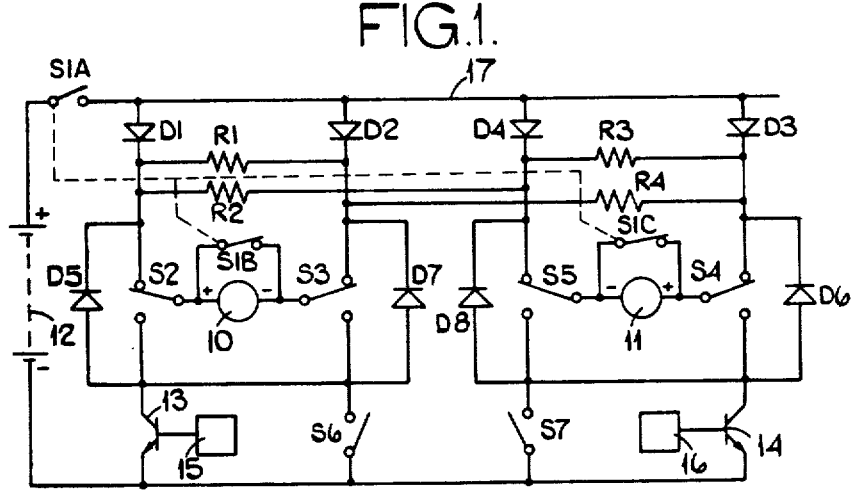
FIG. 1 is a circuit diagram of the system.

Referring to FIG. 1 of the drawings, the system comprises first and second permanent magnet electric motors 10, 11. The motor 10 is coupled to the driving wheel 10A on the left hand side of the vehicle whilst the motor 11 is coupled to the driving wheel 11A on the right hand side of the vehicle. When current is supplied to the motors, then providing the polarity of the supply terminals to the individual motors is as shown in FIG. 1, both motors will rotate their associated wheels in the forward direction.

Figure 3:
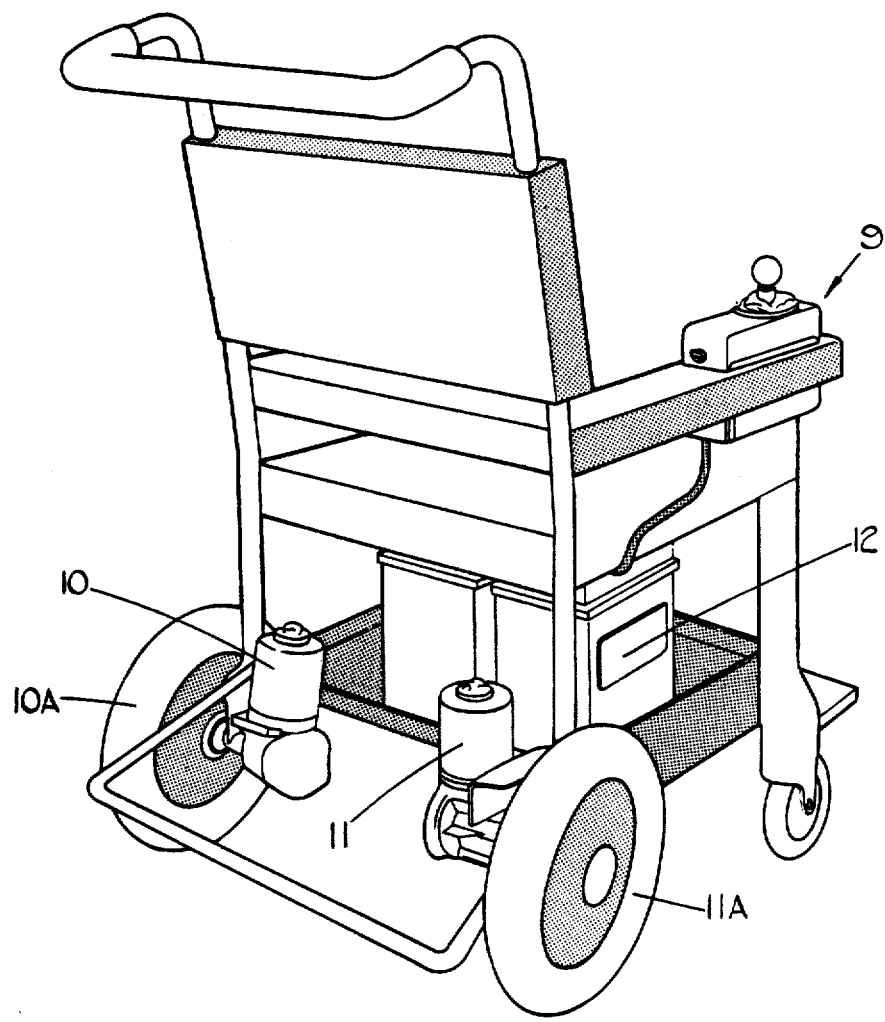
FIG. 3 is a perspective view of a wheelchair operable by a control system of the invention.

The vehicle is of the type for example, an invalid carriage shown in FIG. 3, in which steering of the vehicle is controlled by adjusting the relative flow of current to the two motors 10,11 so as to cause one wheel 10A or 11A to rotate more quickly than the other thereby effecting a steering action. In some situations as will be clearer from the following description, one of the motors may be reversed whilst the other motor is operating in the forward direction and another condition can exist in which one motor is not supplied with power whilst the other motor is supplied with power.

Returning again to FIG. 1 the control circuit can be divided into two parts, each part controlling the operation of its associated motor. The control of the two parts however is under a single control 9 the operation of which will be described with reference to FIG. 2.

In FIG. 1, a storage accumulator 12 is shown providing the power for driving the vehicle and being carried on the vehicle. The negative terminal of the accumulator is connected to the emitter terminals of a pair of transistors 13, 14 which control the magnitude of the current flowing to the motors from the accumulator. Associated with the transistors are a pair of oscillators 15, 16 respectively which control the conduction time of the associated transistors. The negative terminal of the accumulator is also connected to one terminal of a pair of switches S6 and S7.

The positive terminal of the accumulator is connected to a positive supply rail 17 by way of a master switch S1A. This switch is closed when it is required to drive the vehicle and associated with this switch are a pair of further switches S1B and S1C as shown by dotted lines in FIG. 1 which are connected in parallel with the armatures of the motors 10, 11 respectively. The switches S1B and S1C are closed when the switch S1A is open and vice versa. Also provided are diodes D1-D4 inclusive which have their anodes connected to the positive supply rail 17 and their cathodes connected respectively to one terminal of four changeover switches S2, S3, S4 and S5. The terminals connected to the moving contacts of the aforesaid changeover switches are connected to the terminals of the motors respectively, switches S2 and S3 being associated with the motor 10 and switches S4 and S5 being associated with the motor 11. The other terminals of the switches S2 and S3 are connected to the collector of transistor 13 whilst the aforesaid other terminals of the switches S4 and S5 are connected to the collector of transistor 14. The switches S6 and S7 when closed, bridge the transistors 13 and 14 respectively.

Connected between the terminals connected to the fixed contacts of the changeover switch S2 is a diode D5 having its cathode connected to the cathode of diode D1. In similar fashion, diodes D6, D7 and D8 are associated with the changeover switches S4, S3 and S5.

Connected between the cathodes of the diodes D1 and D2 is a resistor R1 and a resistor R3 of comparable resistance value is connected between the cathodes of diodes D3 and D4. Furthermore, connected between the cathodes of diodes D1 and D4 is a resistor R2 and a resistor R4 of comparable value is connected between the cathodes of diodes D2 and D3.

Figure 2:
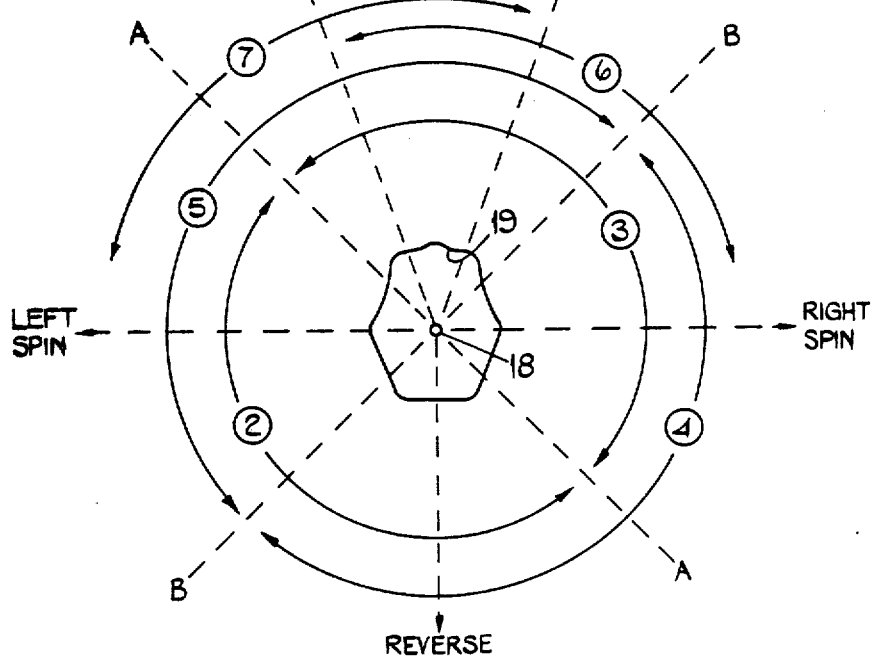
FIG. 2 is a plan view of a control lever which forms part of the system.

Turning now to FIG. 2 a control lever is shown at 18, the control lever being pivotally mounted at one end and having at its other end a suitable handle to enable it to be gripped by the user of the vehicle. The extent of movement of the lever is determined by an aperture 19 formed in a plate through which the lever extends. The lever is connected to a differential mechanism which on movement of the lever in various directions as will be described, effects operation of the switches S2-S7 referred to in FIG. 1 and it also controls the mark/space ratio of the oscillators 15 and 16. As the lever is moved in the forward or reverse direction, from the neutral position, the average current flow through the transistors 13 and 14 increases the further the lever is moved away from the neutral position in which it is shown. As the lever 18 is moved in a plane normal to the forward and reverse plane, a similar effect is produced. Thus the further the lever 18 is from the neutral position the more power will be supplied to the motors. In the forward direction, extreme movement of the lever effects closure of the switches S6 and S7 and as will be seen from FIG. 1 these two switches effectively short out the transistors so that maximum current can flow to the motors respectively.

In FIG. 2 the arcuate arrows together with the associated numbers indicate the position of the lever at which the settings of the respective switches are changed. FIG. 1 shows the positions of the switches S2-S7 in the neutral position, switch S1A being shown in the power off position.

Assuming for the moment that the lever 18 is moved as far as it will go in the forward direction. After a short movement of the lever from the neutral position, the switches S3 and S5 will be moved to their alternative positions and from FIG. 1 it will be seen that the two motors will be switched so that they impart driving motion to the associated wheels, in the forward direction. The amount of power supplied to the motors increases as the lever is moved from the neutral position and as previously stated, in the extreme forward position, the switches S6 and S7 will be closed, so that full power will be supplied to the motors.

In this condition of operation, diode D5 becomes the fly wheel diode of the motor 10 and diode D6, the fly wheel diode of motor 11. No current will flow in the diodes D7 and D8 and the main flow of power to the motors will be by way of diodes D1 and D3.

Considering now that the operating lever is moved about the aperture 19 in the anti-clockwise direction. When the plane identified as X is reached, switch S6 is opened and therefore the current flow through the motor 10 will be reduced and be under the control of the oscillator 15. As a result the vehicle will be steered towards the left. If the lever is moved further in the anti-clockwise direction switch S3 is returned to the position shown in FIG. 1 and in this position, the motor 10 receives no current from the accumulator. The motor therefore free-wheels and a very small braking action is obtained by reason of the provision of the resistor R1 thus the steering effect towards the left is increased. After a further movement in the anti-clockwise direction switch S2 is moved to its alternative position thereby causing the motor 10 to operate in reverse. Once again therefore the steering effect toward the left is increased. Further movement of the operating lever 18 in the anti-clockwise direction causes switch S7 to be opened thereby reducing the amount of power supplied to the right hand motor 11. This is the condition where the vehicle in effect turns about its central xis with the motor 10 operating in reverse and the motor 11 operating in the forward direction, both motors being under the control of the respective oscillators.

As the lever 18 is moved further in the anti-clockwise direction a point will be reached at which switchs S5 is moved to the state in which it is shown in FIG. 1 and hence the motor 11 is no longer supplied with power so that it imparts a small braking effect due to the resistor R3. Further movement of the lever in the anti-clockwise direction causes operation of switch S4 which puts the right hand motor in reverse and since now both mothers are operating in reverse the vehicle will move rearwardly.

If the lever from its extreme forward position is moved in the clockwise direction then a similar chain of events takes place with the vehicle being steered towards the right with the plane Y indicating the position at which switch S7 is opened.

If the vehicle is negotiating a steep down gradient and for example an attempt is made to steer it toward the left then when the switch S3 moves to its alternative position the motor 10 is no longer supplied with power and in previous forms of the circuit full electrical braking was obtained by a resistor equivalent to the resistor R1. A similar situation arises in respect of the motor 11 and associated resistor R3. In the present circuit however, the resistors R1 and R3 have an increased value so that only a small braking effect is applied to the motors when no current is supplied thereto but when current is being supplied to the other motor.

It is however, desirable to obtain a full braking effect when the lever 19 is returned to the neutral position. The braking effect in this situation is obtained by virtue of the resistors R2 and R4 and as will be seen from FIG. 1, which does in fact show the positions of the various switches when the lever is in the neutral position, the two motors 10, 11 are connected in a series circuit including the resistors R2 and R4 also in series. It will be observed that the polarities of the voltages produced by the two motors are such that the two motors combine to cause current flow through the resistors R2 and R4 and therefore these resistors provide the electrical braking of the motors. Under all other conditions of operation substantially no current flow occurs in the resistors R2 and R4 and the reduced amount of braking applied to the motors by virtue of resistors R1 and R3 respectively is not sufficient to cause slewing of the vehicle when the operating lever is in the planes A and B shown in FIG. 2.

I claim:

1. A control system for a pair of driving motors of a vehicle, the vehicle being of the kind in which road wheels on opposite sides of the vehicle are driven by the motors respectively, the steering of the vehicle being achieved by varying the electric current flow to the two motors whereby, in use, one motor can drive its associated road wheel more quickly than the other to achieve a steering action, the control system comprising first and second motor control circuits for the motors respectively, each motor control circuit comprising first and second changeover switches, the switches having common terminals connected to the supply terminals respectively of the associated motor and each switch having first and second changeover terminals, diodes respectively connecting the first changeover terminals of each changeover switch to one terminal of a source of supply, the second changeover terminals being connected to the other terminal of the source of supply whereby when said switches are in a neutral position, the common terminals of the switches will be connected to said first changeover terminals and to the one terminal of the source of supply through said diodes, and in a drive position one of the common terminals of a switch will be connected to said second changeover terminal corresponding therewith and to the other terminal of the source of supply, the first and second changeover switches in each motor control circuit being operable to change the direction of current flow through the associated motor, characterized by a pair of resistors connected between the motor control circuits, said changeover switches when in said neutral position connecting the motors in series with each other and with said pair of resistors.

2. A control system according to claim 1 in which one of said resistors is connected between the first changeover terminal of the first changeover switch of the first motor control circuit and the first changeover terminal of the second changeover switch of the second motor control circuit, and the other resistor is connected between the first changeover terminal of the second changeover switch of the first motor control circuit and the first changeover terminal of the first changeover switch of the second motor control circuit, whereby when the changeover switches are in said first position the supply terminals of both motors will be connected to the one terminal of the supply by way of the respective diodes so that no current can flow in the motors from the supply, the motors being connected in series with each other and said pair of resistors, the resistors having a value such that substantial electrical braking of the motors will be obtained.

3. A control system according to claim 1 including means in each motor control circuit for varying the current flow through the associated motor when one of the changeover switches is in its first position and the other changeover switch is in its second position and vice versa.

4. A control system according to claim 3 in which said means comprises an electronic switch.

5. A control system according to claim 2 including a pair of further resistors associated with the motor control circuits respectively, said further resistors being connected between said first changeover terminals of the first and second changeover switches of the associated motor control circuits, said pair of further resistors each having a value such that only a small braking effect is provided by the associated motor.

* * * * *